United States Patent [19]

Cohn et al.

[11] Patent Number: 4,723,255
[45] Date of Patent: Feb. 2, 1988

[54] EXTENDED LIFETIME RAILGAP SWITCH

[75] Inventors: David B. Cohn, San Pedro; Peter J. Mendoza, Wilmington, both of Calif.

[73] Assignee: Northrop Corporation, Hawthorne, Calif.

[21] Appl. No.: 735,908

[22] Filed: May 20, 1985

[51] Int. Cl.$^4$ .............................................. H01S 3/097
[52] U.S. Cl. ........................................ 372/87; 372/83; 372/55; 372/69; 361/327
[58] Field of Search ........................ 372/87, 83, 55, 69, 372/72, 82; 361/327

[56] References Cited

U.S. PATENT DOCUMENTS

| 4,077,017 | 2/1978 | Gilson et al. | 372/83 |
| 4,223,279 | 9/1980 | Bradford et al. | 372/86 |
| 4,342,115 | 7/1982 | Davis | 372/87 |
| 4,498,183 | 2/1985 | Levatter | 372/57 |

OTHER PUBLICATIONS

Cohn et al., "Photoinitiated Transversely Sustained $CO_2$ Laser", Appl. Phys. Lett., vol. 22, No. 4, 15 Feb. 1973.

Primary Examiner—Leon Scott, Jr.
Attorney, Agent, or Firm—Terry J. Anderson; Robert B. Block

[57] ABSTRACT

An improved railgap switch for use with pulse discharge gas lasers. The blade of the prior art railgap switches is replaced by an electrode having an "T" shaped cross section which provides two edges along which arcs are generated. The thickness of the "T" cross section near the edges at which arcs are formed is relatively uniform and oriented at a constant distance from the second electrode so that the thickness and distance remains unchanged despite ablation of the edges of the electrode. As a consequence the electrical properties of the switch are not altered significantly by ablation caused by repetitive operation of the switch.

4 Claims, 5 Drawing Figures

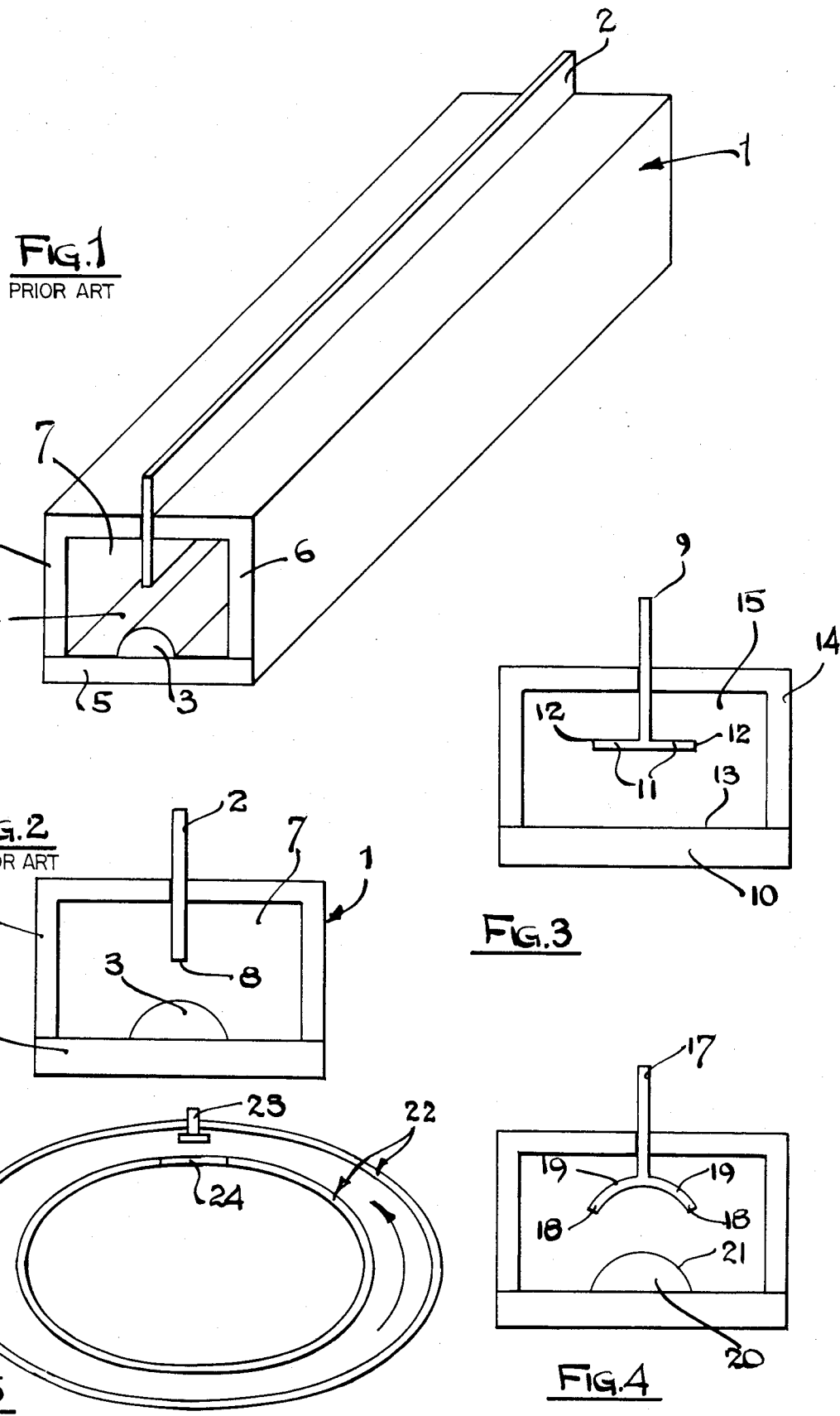

EXTENDED LIFETIME RAILGAP SWITCH

BACKGROUND OF THE INVENTION

1. Field of the Invention

This invention pertains to switching devices for connecting high voltage, high-energy sources to gas discharge lasers so as to discharge high currents in short times through the gas laser medium. More particularly, this invention pertains to railgap switches for use as switching devices in pulse discharge gas laser systems.

2. Description of the Prior Art

FIG. 1 depicts a prior art, railgap switch (1). The switch consists of an elongated metal blade (2) that is located adjacent to elongated bar (3) and which blade is separated from the bar along the elongated length of blade (2) and bar (3) by a small distance or gap (4). Bar (3) typically is attached to plate (5). Blade (2), bar (3) and plate (5) all are made of conducting materials. A housing (6) made of an insulating material maintains the position of blade (2) relative to bar (3), and encloses gas (7), which gas fills the volume enclosed thereby, including the gap between blade (2) and bar (3). A gas mixture such as one composed of 10 percent argon and 90 percent nitrogen molecules ($N_2$) typically is used in the prior art devices. Typically, blade (2) has a thickness of the order of 0.5 millimeters, bar (3) has a diameter of 2 centimeters, the gap (4) is from 0.5 to 2 centimeters in width, and the blade (2) and bar (3) are from 20 centimeters to 1 meter in length.

FIG. 2 shows in cross section, the shape of blade (2) and bar (3) and their relative positions. In operation, a sufficiently high voltage is applied to blade (2), relative to bar (3), to cause the gas in gap (4) to breakdown and form a series of conducting arcs between the blade and bar along their elongated lengths. The initial formation of the arcs may be encouraged by partially pre-ionizing the gas with ultra-voilet or other radiation. Once the arcs are formed, the arcs act, in effect, to connect blade (2) electrically to bar (3), thus, forming a relatively low resistance and low inductance path for the high currents required for exciting pulse discharge gas lasers.

The relatively thin shape of the edge (8) of blade (2), acts, in the initial stage of the formation of arcs between the blade and bar, to concentrate and intensify the electric fields near edge (8), which in turn, reduces the voltage required to initiate arc formation and also causes the arcs to form along edge (8). Repeated operation of the switch at high current densities, however, causes edge (8) of blade (2) to be ablated, thus, effectively increasing the size of the gap between blade (2) and bar (3), as a consequence, changing the electrical characteristics of the switch. Eventually, the ablation of blade (2) is sufficient to require replacement of the blade.

SUMMARY OF INVENTION

In the present invention, blade (2) is replaced by an elongated plate having two edges located at a substantially constant distance from a planar second electrode. The planar electrode has two edges, along which arcs form, thus, for a given application, reducing the current density at the edges in half, which reduction, by itself, reduces the ablation rate by much more than a factor of two. In addition, ablation of the edges of the plate, although it reduces the width of the plate, does not alter significantly the distance between the edges of the plate and the second electrode. As a consequence, the electrical properties of the switch remain relatively constant, despite ablation of the planar electrode. By making the thickness of the plate relatively uniform near its edges, the thickness, and hence, the concentration of the electrical fields near such edges also remains relatively constant despite ablation of the edges, which constancy contributes to stable and consistent electrical performance.

BRIEF DESCRIPTION OF THE DRAWINGS

FIG. 1 is a pictorial drawing of a prior art railgap switch.

FIG. 2 is a cross sectional view of a prior art railgap switch.

FIG. 3 and 4 are cross sectional views of embodiments of the invention.

DESCRIPTION OF THE PREFERRED EMBODIMENTS

FIG. 3 is a cross sectional view of a preferred embodiment of the invention. In the preferred embodiment, the blade electrode of the prior art is replaced by an electrode (9) having a "T" shaped cross section, and the bar shaped electrode of the prior art is replaced by a flat conducting plate (10). The "T" shape of electrode (9) provides two portions (11) of the blade located near the edges (12) thereof, which are relatively thin and relatively uniform in thickness. As a consequence, the electric field concentration near each of edges (12) of electrode (9) is similar to that near edge (8) of blade (2) of the prior art depicted in FIG. 2.

Referring again to FIG. 3, because the portions 11 of electrode (9) are located approximately parallel to, and at a substantially constant distance from, surface (13) of plate (10), the spacing from electrode (9) to plate (10), as measured from edges (12), at which the arcs form to the nearest portions of surface (13), remains relatively constant as edges (12) of electrode (9) ablate with repeated use of the switch.

Because the electrode (9) of the invention has two edges (12), along which arcs form to plate (10), the currents in the arcs are reduced by a factor of two for a particular application and given length of device. The halving of the current density reduces the rate of ablation by much more than two. Furthermore, even with ablation, the distance from edges (12) to plate (10), remains relatively constant with ablation. As a consequence of these two effects, the electrical characterists of the switch remain almost constant with repeated use despite the eventual ablation of significant portions of electrode (9). As a consequence, the present invention exhibits a significantly longer lifetime than those devices of the prior art.

As in the prior art, an insulated housing encloses a gas (15). In the preferred embodiment, the gas is composed of a mixture of 10 percent Argon, and 90 percent nitrogen molecules at a pressure of one atmosphere.

In the preferred embodiment, the electode (9) is approximately 20 centimeters long, the thickness of the portions (11) is approximately 0.375 millimeters, and the width of the gap between the electrodes is approximately 5 millimeters. These dimensions, the gas mixture, and the gas pressure, of course, can be varied to appropriately suit particular applications.

The two important elements of the invention are the doubling of the number of edges at which arcs are formed, thus, reducing the ablation rate, and the reorientation of such edges so that ablation of the edges does not signicantly alter the distance of the edges from the second electrode. Accordingly, it is apparent that the invention may have other embodiments, one of which is depicted in FIG. 4.

In FIG. 4, electrode (17) has two edges (18), along which arcs originate between electrode (17) and bar (20). The electrode (17) has relatively uniform and thin portions (19) near the edges (18), such that as the edges (18) ablate, the thickness near the edges remains relatively constant so that the concentration of electrical fields near the edges remains substantially unchanged with ablation. As depicted in FIG. 4, the shape of electrode (17) in the portions (19) thereof, is curved so as to maintain the portions (19) thereof at a relatively constant distance from the nearest surface (21) of the second electrode, the bar (20). It is apparent from the geometry of the electrodes depicted in FIG. 4 that as edges (18) ablate, the distance of the edges (18) from surface (21) of bar (20) remains substantially constant. Thus, in the embodiment depicted in FIG. 4, the electrical properties of the switch also remain relatively constant with use.

FIG. 5 is a cross-sectional view of another embodiment of the invention wherein the housing (6) depicted in a FIG. 1 has been replaced by a toroidal shaped housing (22) depicted in FIG. 5 through which the gas contained within the housing can circulate past electrode (23) and plate (24). A further advantage of the "T" shaped electrode (23) depicted in FIG. 5 as compared to the shape of electrode (2) depicted in FIG. 1 is that the "T" shape creates much less turbulance than the prior art shape when gas is circulated passed the electrode in an embodiment such as that depicted in FIG. 5. In an application where the switch is used at a high repetition rate, a high velocity of gas flow is necessary in order to clear the conducting channels between current pulses. In such circumstances, the reduction in turbulance obtained by the use of the "T" cross section is important.

I claim:

1. In a railgap switch of the type having an elongate blade electrode made of conductive material, an elongate housing made of insulating material for supporting said blade eletrode and plate electrode in opposed relation extending in the same direction with the blade centered over the plate and separated therefrom by a gap, and a gas filling said housing and said gap, said gas being selected to breakdown and switch from a highly insulative state to a highly conductive state upon application of a high voltage across said blade and plate electrodes, the improvement comprising:

forming said blade with laterally extending transverse wing portions at the edge of said blade and adjacent said gap so as to extend in spaced parallel relation to the surface of said plate, said blade generally following the contour thereof to form an inverted T-shape structure with said wing portions extending transversely of the elongate dimension of the blade, said wing portions terminating in a pair of spaced parallel edges extending along the elongate direction of said blade to thereby create two spaced elongate edges along which arcs form serving to divide the erosion effects of discharge between them, the current through each edge being one-half of that in single-edge devices with ablation wear reduced accordingly to give significantly larger switch lifetime, said blade and wing portions limiting ablation erosion of said edges in a direction generally aligned with the plate contour so that the edge-to-plate separation remains substantially constant.

2. The switch described in claim 1 wherein the elongate plate member has a curved cross section that is oriented at a distance substantially constant to the nearest surface of the second electrode, the nearest surface of which second electrode having a curved surface substantially similar to and substantially concentric with the curved shape of the elongate plate member.

3. The device described in claim 1 wherein the elongate plate member has a substantially flat surface located substantially parallel to the nearest surface of the second electrode, the nearest surface of which second electrode also being substantially flat.

4. The switch described in claim 3 wherein a gas is circulated between the elongate first and second electrodes in a direction substantially transverse to the elongate direction.

* * * * *